United States Patent
George et al.

(10) Patent No.: US 9,933,037 B1
(45) Date of Patent: Apr. 3, 2018

(54) CABLE DAMPENING SYSTEM AND TRAFFIC CONTROL ASSEMBLY COMPRISING SAME

(71) Applicant: Pelco Products, Inc., Edmond, OK (US)

(72) Inventors: Kennith E. George, Edmond, OK (US); Kevin S. Shook, Luther, OK (US)

(73) Assignee: Pelco Products, Inc., Edmond, OK (US)

( * ) Notice: Subject to any disclaimer, the term of this patent is extended or adjusted under 35 U.S.C. 154(b) by 0 days.

(21) Appl. No.: 15/226,039

(22) Filed: Aug. 2, 2016

Related U.S. Application Data

(63) Continuation of application No. 14/798,085, filed on Jul. 13, 2015, now abandoned.

(60) Provisional application No. 62/023,339, filed on Jul. 11, 2014.

(51) Int. Cl.
| | |
|---|---|
| *F16L 3/08* | (2006.01) |
| *F16F 7/14* | (2006.01) |
| *D07B 1/06* | (2006.01) |
| *G08G 1/095* | (2006.01) |

(52) U.S. Cl.
CPC ............ *F16F 7/14* (2013.01); *D07B 1/06* (2013.01); *G08G 1/095* (2013.01)

(58) Field of Classification Search
CPC . G08G 1/09; G08G 1/095; D07B 1/06; F21V 21/008; F16F 7/14
USPC .............. 174/42; 248/589, 70, 61, 317–344; 340/907–932.1
See application file for complete search history.

(56) References Cited

U.S. PATENT DOCUMENTS

| | | | |
|---|---|---|---|
| 2,486,734 A | 11/1949 | Campbell |
| 2,925,458 A | 2/1960 | Lester |
| 2,956,768 A | 10/1960 | Livingston |
| 3,586,280 A | 6/1971 | Parduhn |
| 3,764,099 A | 10/1973 | Parduhn |
| 3,854,685 A | 12/1974 | Parduhn |
| 3,916,265 A | 10/1975 | Friedman |
| 4,032,248 A | 6/1977 | Parduhn et al. |

(Continued)

FOREIGN PATENT DOCUMENTS

| | | |
|---|---|---|
| CH | 380818 | 9/1964 |
| DE | 1489510 | 12/1964 |

OTHER PUBLICATIONS

Transportation Research Board of the National Academies, "Not So Good Vibrations," Ignition, Fall/Winter 2011, p. 6, Fall/Winter 2011, Transportation Research Board of the National Academies, Washington, DC, USA.

*Primary Examiner* — Christopher Garft
(74) *Attorney, Agent, or Firm* — Mary M. Lee

(57) ABSTRACT

A traffic control assembly comprising a length of flexible cable as a cable dampener. The cable may be formed of wire rope, which comprises a bundle of twisted wire strands, with a fitting at each end. The cable section has the ability to resist torsional movement and the ability to bend to a limited extent along its vertical axis in response to wind forces and to return to its resting or straight configuration like a spring as the wind subsides. This provides a dampening function between the components of the traffic control assembly to absorb impacts imposed by winds or moving objects so as to reduce the likelihood that the connection will break and disconnect or dislocate the signal or other traffic control device.

6 Claims, 6 Drawing Sheets

(56) References Cited

U.S. PATENT DOCUMENTS

| | | |
|---|---|---|
| D246,585 S | 12/1977 | Parduhn |
| D249,517 S | 9/1978 | Parduhn |
| 4,135,192 A | 1/1979 | Parduhn |
| 4,441,626 A | 4/1984 | Hall |
| D276,213 S | 11/1984 | Parduhn |
| 4,520,984 A | 6/1985 | Rouleau |
| D286,667 S | 11/1986 | Parduhn |
| 4,646,997 A | 3/1987 | Fadley |
| 4,659,046 A | 4/1987 | Parduhn |
| 4,691,884 A | 9/1987 | Parduhn |
| D328,243 S | 7/1992 | Parduhn |
| D329,589 S | 9/1992 | Parduhn |
| D335,279 S | 5/1993 | Parduhn |
| 5,299,111 A | 3/1994 | Parduhn et al. |
| D373,947 S | 9/1996 | Parduhn |
| D379,756 S | 6/1997 | Parduhn |
| 5,645,255 A | 7/1997 | Parduhn |
| 5,921,399 A | 7/1999 | Bakula et al. |
| 5,935,478 A | 8/1999 | Parduhn |
| 6,204,446 B1 | 3/2001 | Parduhn |
| 6,357,709 B1 | 3/2002 | Parduhn |
| 7,258,314 B1 | 8/2007 | Parduhn et al. |
| 7,523,912 B1 | 4/2009 | Woods |
| 7,601,928 B1 | 10/2009 | Magness et al. |
| 7,876,236 B2 | 1/2011 | Townsend, Jr. |
| 7,997,546 B1 | 8/2011 | Anderson et al. |
| 8,018,350 B2 | 9/2011 | Townsend, Jr. |
| 8,154,425 B2 | 4/2012 | Townsend, Jr. |
| 8,173,904 B1 | 5/2012 | Parduhn et al. |
| 8,395,531 B2 | 3/2013 | Townsend, Jr. |
| 8,474,780 B2 | 7/2013 | Parduhn et al. |
| 8,540,392 B2 | 9/2013 | Townsend, Jr. |
| 8,659,445 B2 | 2/2014 | Townsend, Jr. |
| 8,749,402 B2 | 6/2014 | Townsend, Jr. |
| 8,810,432 B2 | 8/2014 | Townsend, Jr. |
| 8,875,451 B1 | 11/2014 | Parduhn et al. |
| 9,041,555 B2 | 5/2015 | Townsend, Jr. |
| 9,051,947 B2 | 6/2015 | Townsend, Jr. |
| 9,200,654 B1 | 12/2015 | Parduhn |
| 9,316,349 B1 | 4/2016 | Parduhn et al. |
| 9,322,536 B1 | 4/2016 | Parduhn et al. |
| 9,599,275 B1 | 3/2017 | Parduhn et al. |
| 2007/0278376 A1 | 12/2007 | Townsend, Jr. |
| 2010/0148139 A1 | 6/2010 | Anderson et al. |
| 2011/0089298 A1 | 4/2011 | Townsend, Jr. |
| 2011/0089301 A1 | 4/2011 | Townsend, Jr. |
| 2011/0155872 A1 | 6/2011 | Townsend, Jr. |
| 2013/0087672 A1 | 4/2013 | Townsend, Jr. |
| 2013/0095710 A1 | 4/2013 | Townsend, Jr. |
| 2013/0146733 A1* | 6/2013 | Townsend, Jr. ......... F21V 21/008 248/342 |
| 2013/0241380 A1 | 9/2013 | Townsend, Jr. |
| 2013/0248673 A1 | 9/2013 | Townsend, Jr. |
| 2014/0042288 A1 | 2/2014 | Townsend, Jr. |
| 2014/0048669 A1 | 2/2014 | Townsend, Jr. |
| 2014/0124234 A1* | 5/2014 | Richardson, Jr. ......... H02G 7/14 174/42 |
| 2014/0252190 A1 | 9/2014 | Townsend, Jr. |

* cited by examiner

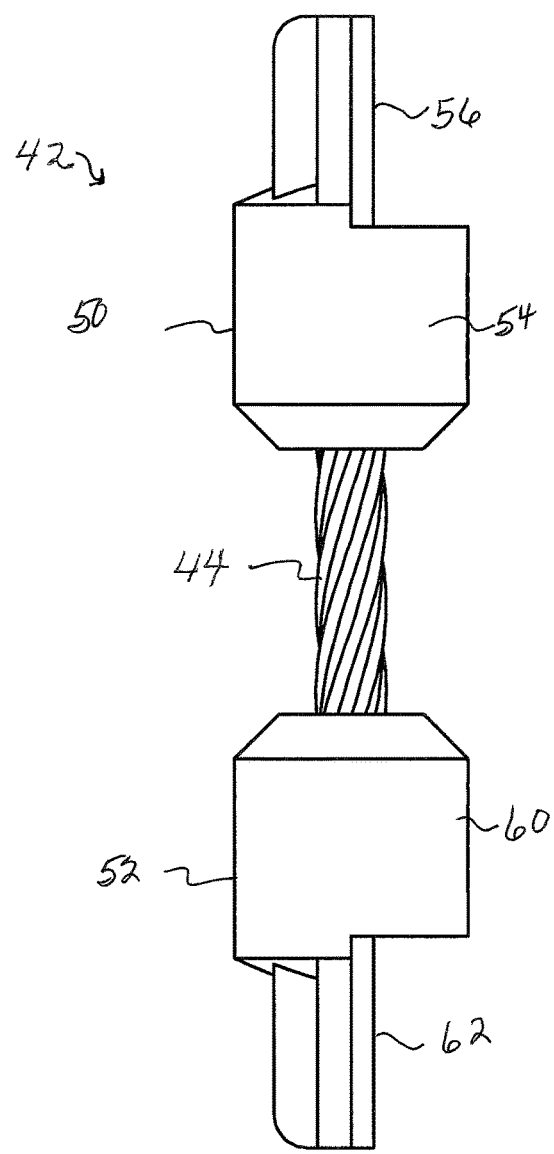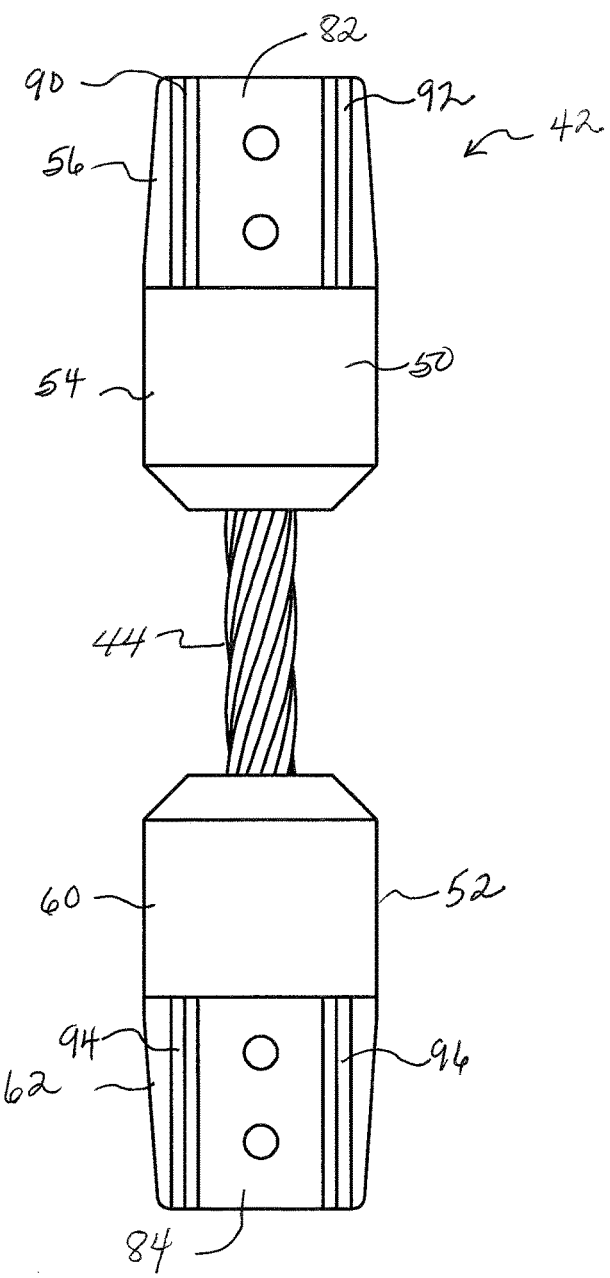
FIG. 3  FIG. 4

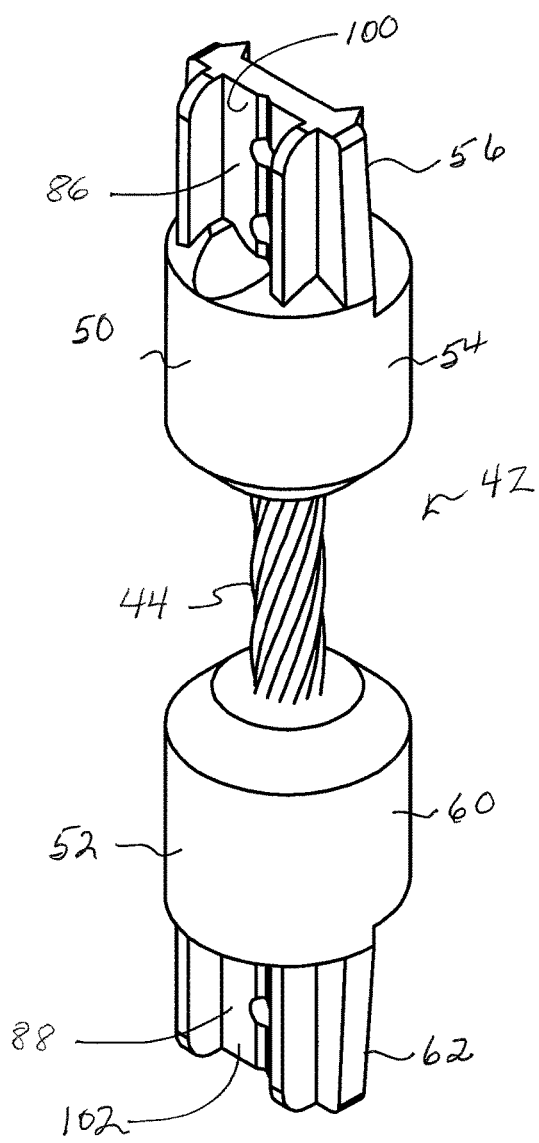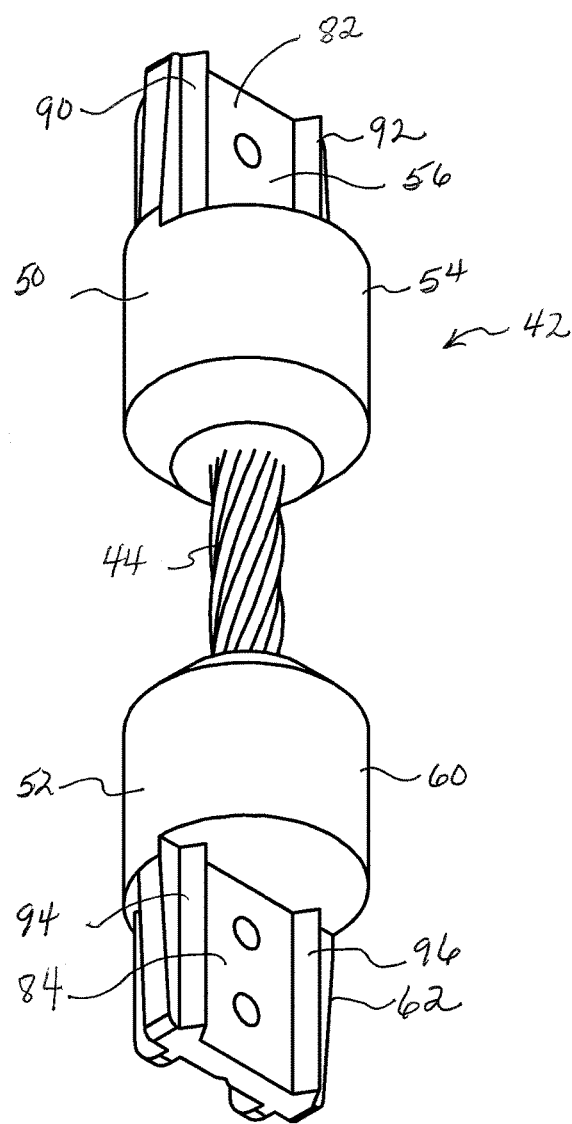
*FIG. 5*  *FIG. 6*

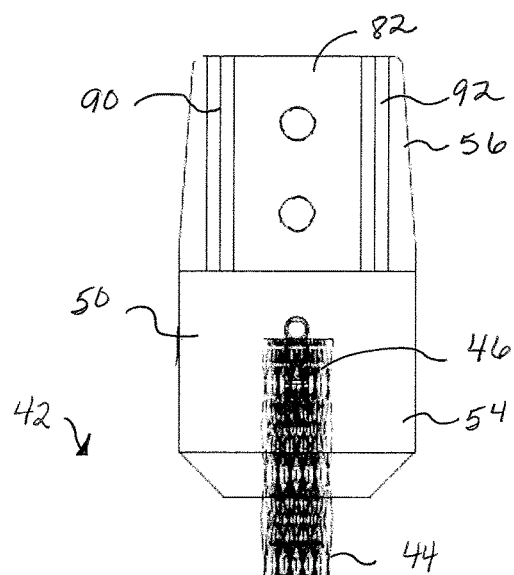
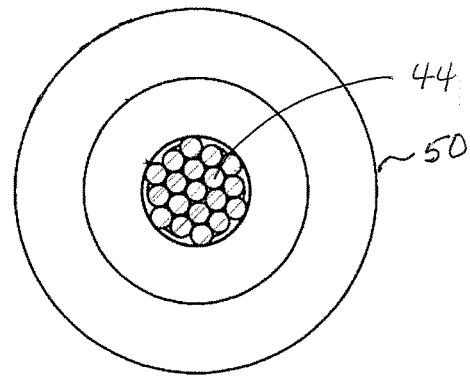
Fig. 8
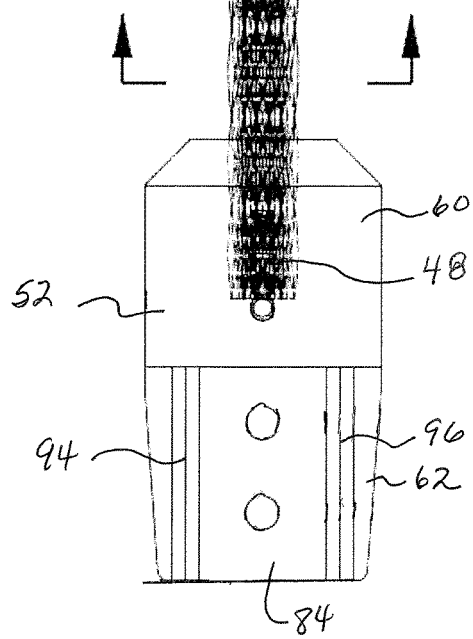
Fig. 7
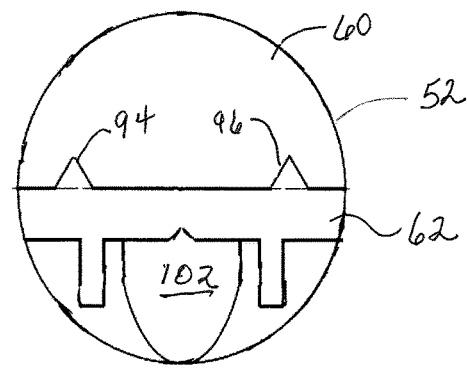
Fig. 9

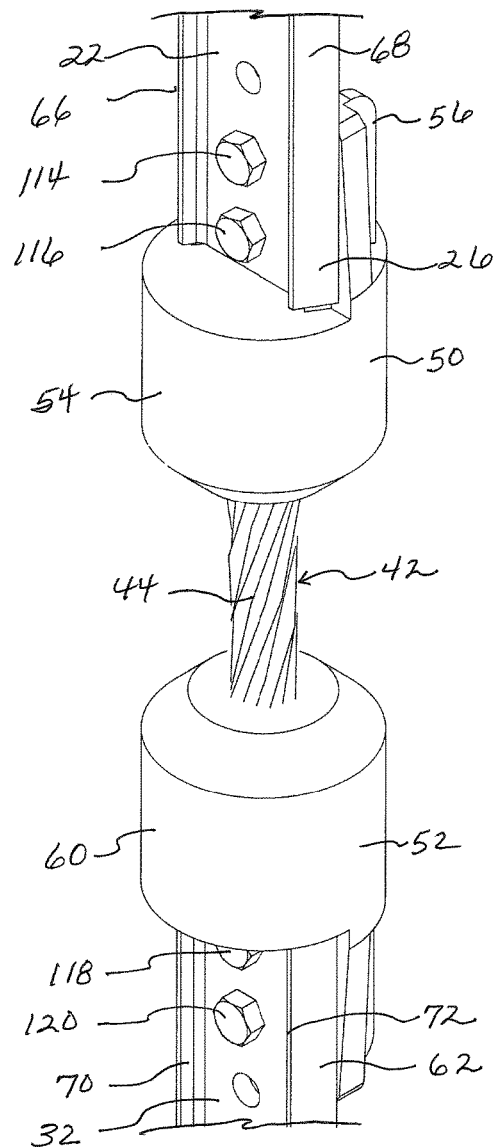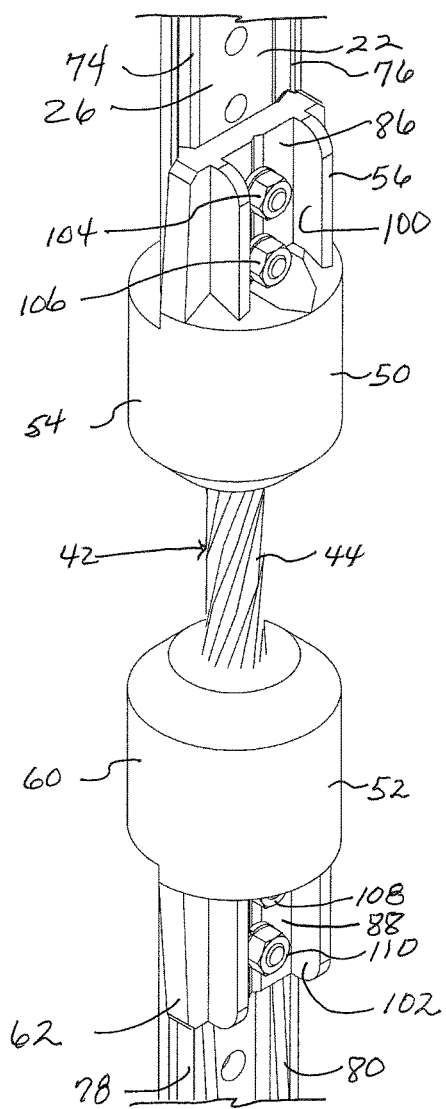
FIG. 10  FIG. 11

CABLE DAMPENING SYSTEM AND TRAFFIC CONTROL ASSEMBLY COMPRISING SAME

CROSS-REFERENCE TO RELATED APPLICATIONS

This application is continuation of co-pending application Ser. No. 14/798,085, entitled "Cable Dampening System and Traffic Control Assembly Comprising Same," filed Jul. 13, 2015, which application claims the benefit of U.S. provisional application No. 62/023,339 entitled "Cable Dampening System and Traffic Control Assembly Comprising Same," filed Jul. 11, 2014, and the contents of both these applications are incorporated herein by reference.

FIELD OF THE INVENTION

The present invention relates generally to traffic control devices.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawing merely illustrates a preferred embodiment of the invention and is not to be construed as limiting the scope of the invention. In particular, while some of the drawings show preferred dimensional characteristics, these are merely exemplary and non-limiting.

FIG. 3 is side elevational view of the cable dampener shown in FIG. 1, the opposite side being a mirror image thereof.

FIG. 4 is a front view of the cable dampener.

FIG. 5 is a rear perspective view of the cable dampener.

FIG. 6 is a front perspective view of the cable dampener.

FIG. 7 is a longitudinal sectional view of the cable dampener.

FIG. 8 is a cross sectional view taken along the line 8-8 in FIG. 7, illustrating the preferred bundled wire construction of the cable portion.

FIG. 9 is an end view of the cable dampener.

FIG. 10 is a fragmented, frontal perspective view of the cable dampener attached to the upper and lower upper rigid hanger members.

FIG. 11 is a fragmented, rear perspective view of the cable dampener attached to the upper and lower upper rigid hanger members.

DETAILED DESCRIPTION OF THE PREFERRED EMBODIMENT(S)

Traffic control devices, such as traffic signals or signs, frequently are suspended over roadways by a pair of horizontal wires or cables. The upper wire is typically referred to as the span wire, and the lower wire is called the messenger wire. A saddle-shaped span wire clamps rides on the span wire. The upper end of an elongate adjustable hanger is pivotally attached to the span wire clamp, and another clamp on the bottom end of the hanger is attached to the messenger wire.

Because of the flexibility of the span wire and messenger wire, the hanger is particularly vulnerable to damage resulting from the high winds and flying debris. Damage or displacement of a traffic signal leaves drivers and pedestrians without any direction at intersections leading to confusion and increasing the likelihood of traffic accidents and delays in emergency personnel response times. Detached components from damaged traffic devices may fall on pedestrian and vehicular traffic passing underneath or may create obstructions in the roadway. Still further, the repair and replacement of damaged or lost traffic devices is a financial burden on the responsible government or municipality. These and other features and advantages of the present invention will become apparent from the following description with reference to the accompanying drawings.

Figure 1:
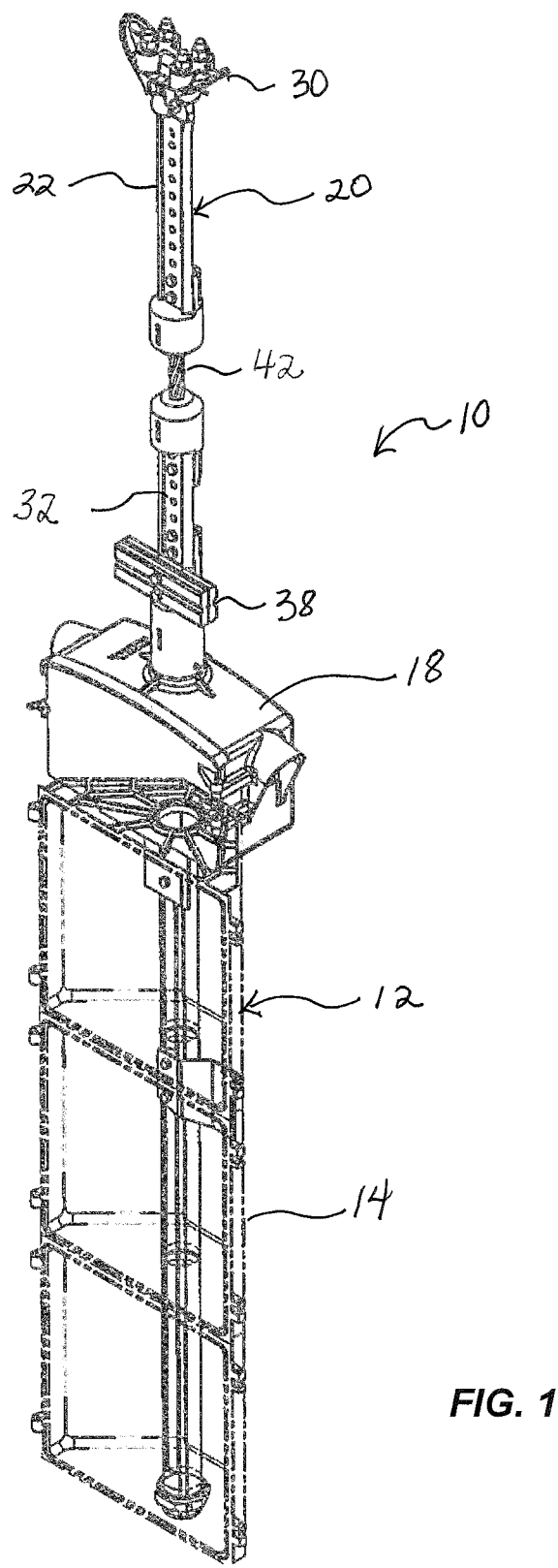
FIG. 1 is a frontal perspective view of a traffic control assembly comprising a traffic signal housing suspended from a disconnect hanger box that is supported by a flexible hanger assembly that includes cable dampener made in accordance with a preferred embodiment of the present invention.

Turning now to the drawings in general and to FIG. 1 in particular, there is shown therein a traffic control assembly designated generally by the reference number 10. The assembly 10 comprises a traffic control device, such a three light traffic signal 12 with three lights aligned vertically in a housing 14. While in the embodiment shown the traffic control device 12 is a signal light, the invention may be used with other devices. As used herein, "traffic control device" denotes any device useful in monitoring, illuminating, directing, informing, or controlling pedestrian or vehicular traffic on roadways, parking lots, walkways, and the like, and includes without limitation traffic signals, cameras, antennas, sensors, monitors, signs, junction boxes, wireless devices, microwave transmission devices, lights, horns and other warning devices, and counting devices.

The top of the signal housing 14 is attached to the bottom of a disconnect hanger box 18. The traffic control assembly 10 includes a flexible hanger assembly 20 that is attachable to the span wire and messenger wire (not shown). The flexible hanger assembly 20 includes an upper rigid hanger member 22 having first and second ends 24 and 26. As seen also in FIG. 2, the first or upper end 24 of the upper hanger member 22 is pivotally connectable to the span wire clamp 30.

The flexible hanger 20 also comprises a lower rigid hanger member 32 having first and second ends 34 and 36. The second, lower end 36 is connectable to the top of the disconnect hanger box 18 by any suitable means, such as the tri-stud connector 38 shown in FIG. 2. A conventional messenger wire clamp 40 is provided above the tri-stud connector 38 for attaching the assembly 10 to the messenger wire (not shown). Advantageously, the upper and lower hanger members 22 and 32 are conventional hanger extension bars.

Figure 2:
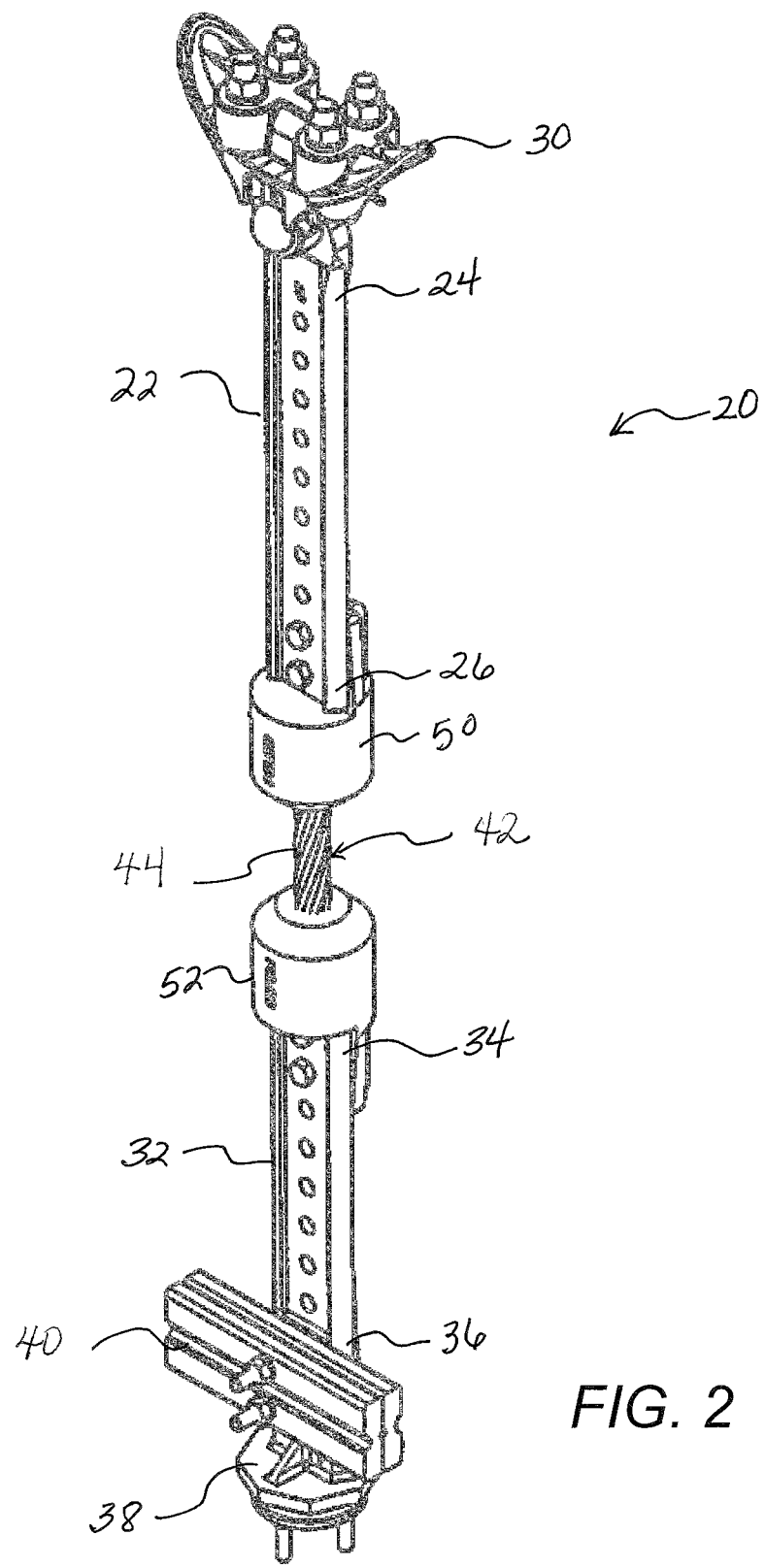
FIG. 2 is an enlarged, frontal perspective view of the flexible hanger assembly of the traffic control assembly shown in FIG. 1.

Referring still to FIG. 2 and now also to FIGS. 3-9, the flexible hanger assembly 20 preferably also includes a flexible hanger connector 42. The connector includes a length of flexible cable 44 having first and second ends 46 and 48 (FIG. 7). The flexible cable 42 ideally is wire rope, which comprises a bundle of twisted wire strands, depicted in FIGS. 7 and 8.

The flexible hanger connector 40 includes first and second end fittings 50 and 52. The first end fitting 50 has first and second ends 54 and 56. The first end 54 is connectable to the first end 44 of the flexible cable 42, and the second end 56 is connectable to the second end 26 of the upper rigid hanger member 22, as best seen in FIG. 2. The second end fitting 52 has first and second ends 60 and 62. The first end 60 is connectable to the second end 46 of the flexible cable 42, and the second end 62 is connectable to the first end 34 of the lower rigid hanger member 34. By way of example, the ends of the cable 42 may be cast in place in a single mold, as this provides a secure connection between the end fittings 50 and 52 and the respective ends 44 and 46 of the cable.

The cable 44 is selected for the ability to bend to a limited extent along its vertical axis. It should be resilient, that is, it should have the characteristic that when the wind force is reduced the cable returns to its resting or straight configuration like a spring. Additionally, it is preferred that the cable 44 resists any significant torsional movement. The object of these characteristics is to provide a dampening function between the disconnect box 18 and the upper span wire (not shown). This will absorb movement as the traffic control assembly 10 is impacted by winds or moving objects to reduce the likelihood that the connection will break and disconnect or dislocate the signal or other traffic control device 12.

The length of the cable 44 in the flexible hanger connector 42 the may vary. For example, the length preferably is between about one (1) in and about ten (10) inches. More preferably, the length of the exposed cable is between about two (2) inches and about four (4) inches. And, as shown, most preferably, the length is about three (3) inches.

As indicated previously, the upper and lower hanger members 22 and 32 may be conventional hanger extension bars. These bars typically are a solid bar formed by extruding the desired metal into a selected profile. Typically the cross-sectional profile includes two parallel, spaced-apart ribs 66, 68, and 70, 72 on one surface, as seen in FIG. 10, and these ribs form corresponding grooves 74, 76 and 78, 80 on the opposite surface, as seen in FIG. 11.

In the preferred embodiment, the end fittings 50 and 52 are configured to mate with the profiled ends of these conventional hanger extension bars 20 and 32. To that end, each of the end fittings 50 and 52 may have a front face 82, 84 (FIGS. 4 & 6), respectively, and a rear face 86, 88 (FIG. 5), respectively. Each of the front faces 82 and 84 is provided with parallel, spaced-apart ribs 90, 92, and 94, 96 that mate with the grooves 74, 76 and 78, 80 on the upper and lower hanger members 22 and 32. Each of the rear faces 84 and 86 of the end fittings 50 and 52 may be formed as a bolt channel or recess 100, 102 for receiving the nuts 104, 106 and 108, 110 (FIG. 11) that secure the attachment bolts 114, 116, and 118, 120 (FIG. 10).

In the assembly shown, a single flexible hanger connector 42 is shown connected between the upper hanger member 22 and the lower hanger member 32. The location near the lower part of the extension bar assembly and above the disconnect box 18 is ideal. However, the position and number of flexible hanger connectors employed may vary.

Now it will be appreciated that the present invention provides a flexible cable dampener device that can be installed in conventional hanger/extension bar systems to provide needed resistance to flexion and torsional motions generated by wind and impacts while reducing the likelihood that the hanger will break.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the inventions to the full extent indicated by the broad meaning of the terms in the attached claims. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A flexible hanger assembly for a traffic control assembly, wherein the traffic control assembly comprises a traffic control device attached to the bottom of a disconnect hanger box, wherein the traffic control assembly is supportable from a span wire and messenger wire, and wherein the flexible hanger assembly comprises:

an upper rigid hanger member having first and second ends, the first end connectable to the span wire;

a lower rigid hanger member having first and second ends, the second end connectable to the disconnect hanger box;

wherein the upper and lower rigid hanger members are conventional hanger extension bars;

a flexible hanger connector comprising:

a length of flexible cable having first and second ends, wherein the length of flexible cable comprises wire rope;

a first end fitting having first and second ends, the first end connectable to the first end of the flexible cable and the second end connectable to the second end of the upper rigid hanger member; and a second end fitting having first and second ends, the first end connectable to the second end of the flexible cable and the second end connectable to the first end of the lower rigid hanger member;

wherein each of the first and second end fittings has a front face and a rear face, and wherein each front face has a pair of spaced apart parallel ribs configured to mate with the conventional hanger extension bars.

2. The flexible hanger assembly of claim 1 wherein each rear face defines a bolt channel.

3. A traffic control assembly comprising the flexible hanger assembly of claim 1.

4. A flexible hanger connector for a hanger assembly for a traffic control assembly, wherein the traffic control assembly comprises a traffic control device attached to the bottom of a disconnect hanger box, wherein the hanger assembly comprises upper and lower conventional hanger extension bars, the upper extension bar having an upper end connectable to a span wire and the lower extension bar having a lower end connectable to a messenger wire, and wherein the flexible hanger connector comprises:

a length of flexible cable having first and second ends, wherein the length of flexible cable comprises wire rope;

a first end fitting having first and second ends, the first end connectable to the first end of the flexible cable and the second end connectable to the lower end of the upper extension bar; and a second end fitting having first and second ends, the first end connectable to the second end of the flexible cable and the second end connectable to the upper end of the lower extension bar;

wherein each of the first and second end fittings of has a front face and a rear face, and wherein each front face has a pair of spaced apart parallel ribs configured to mate with the upper and lower extension bars.

5. The flexible hanger connector of claim 4 wherein each rear face defines a bolt channel.

6. A traffic control assembly comprising the flexible hanger connector of claim 4.

\* \* \* \* \*